US009727467B2

(12) United States Patent
McKenney (10) Patent No.: US 9,727,467 B2
(45) Date of Patent: *Aug. 8, 2017

(54) PREEMPTIBLE-RCU CPU HOTPLUGGING WHILE MAINTAINING REAL-TIME RESPONSE (71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/832,291

(22) Filed: Aug. 21, 2015

(65) Prior Publication Data
US 2016/0335137 A1 Nov. 17, 2016

Related U.S. Application Data (63) Continuation of application No. 14/708,609, filed on May 11, 2015.

(51) Int. Cl.
G06F 12/00 (2006.01)
G06F 12/0831 (2016.01)
(Continued)

(52) U.S. Cl.
CPC ........ *G06F 12/0833* (2013.01); *G06F 9/5094* (2013.01); *G06F 9/522* (2013.01);
(Continued)

(58) Field of Classification Search
USPC .......................................... 711/122
See application file for complete search history.

(56) References Cited

U.S. PATENT DOCUMENTS 5,442,758 A    8/1995  Slingwine et al.
5,608,893 A    3/1997  Slingwine et al.
(Continued)

OTHER PUBLICATIONS

P. McKenney et al., "Read-Copy Update: Using Execution History to Solve Concurrency Problems," PDCS, Oct. 1998, 11 pages.
(Continued)

*Primary Examiner* — Prasith Thammavong
(74) *Attorney, Agent, or Firm* — Walter W. Duft (57) ABSTRACT A grace period detection technique for a preemptible read-copy update (RCU) implementation that uses a combining tree for quiescent state tracking. When a leaf level bitmask indicating online/offline CPUs is fully cleared due to all of its assigned CPUs going offline as a result of hotplugging operations, the bitmask state is not immediately propagated to the root level of the combining tree as in prior art RCU implementations. Instead, propagation is deferred until all tasks are removed from an associated leaf level task list tracking tasks that were preempted inside an RCU read-side critical section. Deferring bitmask propagation obviates the need to migrate the task list to the combining tree root level in order to prevent premature grace period termination. The task list can remain at the leaf level. In this way, CPU hotplugging is accommodated while avoiding excessive degradation of real-time latency stemming from the now-eliminated task list migration.

7 Claims, 8 Drawing Sheets (51) Int. Cl.
  *G06F 12/0811* (2016.01)
  *G06F 9/52* (2006.01)
  *G06F 12/128* (2016.01)
  *G06F 9/50* (2006.01)
(52) U.S. Cl.
  CPC .............. *G06F 9/526* (2013.01); *G06F 9/528* (2013.01); *G06F 12/0811* (2013.01); *G06F 12/128* (2013.01); *G06F 2212/283* (2013.01); *G06F 2212/62* (2013.01); *G06F 2212/69* (2013.01)

(56) References Cited

U.S. PATENT DOCUMENTS

| | | | |
|---|---|---|---|
| 5,727,209 | A | 3/1998 | Slingwine et al. |
| 5,872,963 | A | 2/1999 | Bitar et al. |
| 6,219,690 | B1 | 4/2001 | Slingwine et al. |
| 6,418,460 | B1 | 7/2002 | Bitar et al. |
| 6,662,184 | B1 | 12/2003 | Friedberg |
| 6,886,162 | B1 | 4/2005 | McKenney |
| 6,996,812 | B2 | 2/2006 | McKenney |
| 7,191,272 | B2 | 3/2007 | McKenney |
| 7,287,135 | B2 | 10/2007 | McKenney et al. |
| 7,349,879 | B2 | 3/2008 | Alsberg et al. |
| 7,353,346 | B2 | 4/2008 | McKenney et al. |
| 7,395,263 | B2 | 7/2008 | McKenney |
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,721,291 | B2 | 5/2010 | McKenney |
| 7,734,879 | B2 | 6/2010 | McKenney et al. |
| 7,734,881 | B2 | 6/2010 | McKenney et al. |
| 7,739,685 | B2 | 6/2010 | Vaddagiri |
| 7,747,805 | B2 | 6/2010 | McKenney |
| 7,814,082 | B2 | 10/2010 | McKenney |
| 7,818,306 | B2 | 10/2010 | McKenney et al. |
| 7,904,436 | B2 | 3/2011 | McKenney |
| 7,953,708 | B2 | 5/2011 | McKenney et al. |
| 7,953,778 | B2 | 5/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney |
| 8,195,893 | B2 | 6/2012 | Triplett |
| 8,407,503 | B2 | 3/2013 | McKenney |
| 8,495,641 | B2 | 7/2013 | McKenney |
| 8,615,771 | B2 | 12/2013 | McKenney |
| 8,706,706 | B2 | 4/2014 | McKenney |
| 8,874,535 | B2 | 10/2014 | McKenney |
| 8,924,655 | B2 | 12/2014 | McKenney |
| 8,938,631 | B2 | 1/2015 | McKenney |
| 8,972,801 | B2 | 3/2015 | McKenney |
| 9,003,420 | B2 | 4/2015 | McKenney |
| 2008/0082532 | A1 | 4/2008 | McKenney |
| 2011/0302589 | A1 | 12/2011 | Aussagues |
| 2012/0324170 | A1 | 12/2012 | McKenney |
| 2012/0324473 | A1* | 12/2012 | McKenney .............. G06F 9/526 718/107 |
| 2012/0331237 | A1 | 12/2012 | McKenney |
| 2013/0061071 | A1 | 3/2013 | McKenney |
| 2013/0138896 | A1 | 5/2013 | McKenney |
| 2013/0151798 | A1 | 6/2013 | McKenney |
| 2013/0152095 | A1* | 6/2013 | McKenney .............. G06F 9/522 718/102 |
| 2014/0281295 | A1 | 9/2014 | McKenney |
| 2014/0379676 | A1 | 12/2014 | McKenney |
| 2014/0380084 | A1 | 12/2014 | McKenney |
| 2015/0153817 | A1* | 6/2015 | McKenney ........... G06F 9/5094 713/323 |

OTHER PUBLICATIONS

P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[Patch] slab: document SLAB_DESTROY_BY_RCU", LKML.org, Nov. 13, 2008, 1 page.
D. Sarma et al., "Making RCU Safe for Deep Sub-Millisecond Response Realtime Applications," 2004 USENIX (Uselinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN.net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN.net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net,Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.

(56) References Cited

OTHER PUBLICATIONS

M. Desnoyers et al., "User-Level Implementations of Read-Copy Update", IEEE Transactions on Parallel and Distributed Systems, vol. x, No. y, Jul. 2009, pp. 1-14.

P. McKenney, "Making RCU Safe for Battery-Powered Devices", Embedded Linux Conference, Feb. 15, 2012, pp. 1-66.

P. McKenney, "Real-Time Response on Multicore Systems: It Is Bigger Than You Think", OSPERT '12 Workshop, Jul. 10, 2012, pp. 1-34.

P. McKenney, "Getting RCU Further Out of the Way", 2012 Linux Plumbers Conference, Real Time Microconference, Aug. 31, 2012, 31 pages.

P. McKenney, "The new visibility of RCU processing", LWN.net, Oct. 10, 2012, 4 pages.

P. McKenney, "CPU, Hotplug, RCU, and big.LITTLE", Linaro Connect, Nov. 1, 2012, 33 pages.

P. McKenney, Bare-Metal Multicore Performance in a General-Purpose Operating System, Multicore World, Feb. 2013, 66 pages.

P. McKenney, "Simplifying RCU", LWN.net, Mar. 6, 2013.

P. McKenney, "User-space RCU", LWN.net, Nov. 13, 2013, 15 pages.

J. Corbet, "The RCU-tasks subsystem", LWN.net, Jul. 30, 2014.

P. McKenney, "The RCU API, 2014 Edition", LWN.net, Sep. 4, 2014.

M. Arbel et al., "Concurrent Updates with RCU: Search Tree as an Example", PODC 2014, 10 pages.

S. Bhat, "percpu_rwlock: Implement the core design of Per-CPU Reader-Writer Locks", <https://patchwork.kernel.org/patch/2157401/>, Feb. 2014, 15 pages.

N. Brown, "Using rcu for linked lists—a case study", LWN.net, Sep. 2014, 9 pages.

J. Corbet, "C11 atomic variables and the kernel", LWN.net, Feb. 18, 2014, 15 pages.

J. Corbet, "C11 atomics part 2: 'consume' semantics", LWN.net, Feb. 26, 2014, 7 pages.

J. Corbet, "RCU, cond_resched(), and performance regressions", LWN.net, Jun. 24, 2014, 8 pages.

J. Corbet, "Relativistic hash tables, part 1: Algorithms", LWN.net, Sep. 17, 2014, 17 pages.

J. Corbet, "Relativistic hash tables, part 2: Implementation", LWN.net, Sep. 17, 2014, 4 pages.

R. Liu et al., "Scalable Read-mostly Synchronization Using Passive Reader-Writer Locks", USENIX ATC, Jun. 2014, pp. 219-230.

P. McKenney, "Structured Deferral: Synchronization via Procrastination", Queue, 11(5), May 2013, pp. 20:20-20:39.

S. Tu et al., "Speedy Transactions in Multicore In-Memory Databases", ACM SOSP, 2013, 15 pages.

P. Zijlstra, "Another go at speculative page faults", <https://lkml.org/lkml/2014/10/20/620>, Oct. 2014, 2 pages.

International Business Machines Corporation, "List of IBM Patents or Patent Applications Treated as Related", Oct. 15, 2015, 2 pages.

\* cited by examiner

PREEMPTIBLE-RCU CPU HOTPLUGGING WHILE MAINTAINING REAL-TIME RESPONSE

This application is a continuation under 35 U.S.C. 120 of application Ser. No. 14/708,609, filed May 11, 2015, entitled "Preemptible-RCU CPU Hotplugging While Maintaining Real-Time Response."

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

Figure 1A:
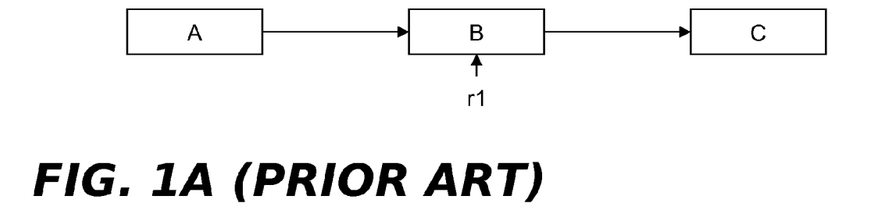
FIGS. 1A-1D are diagrammatic representations of a linked list of data elements undergoing a data element replacement according to a conventional read-copy update mechanism.
Figure 1B:
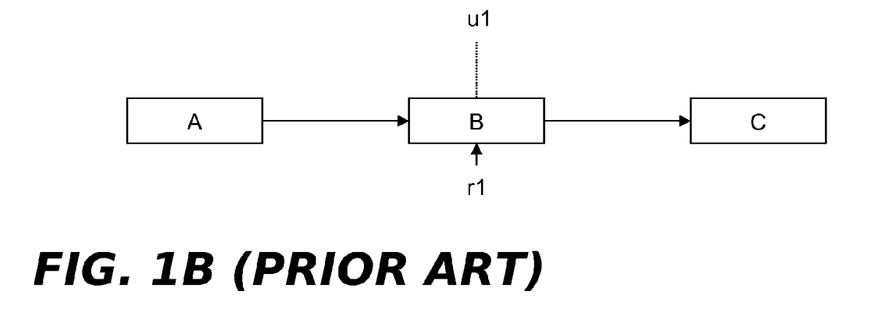
Figure 1C:
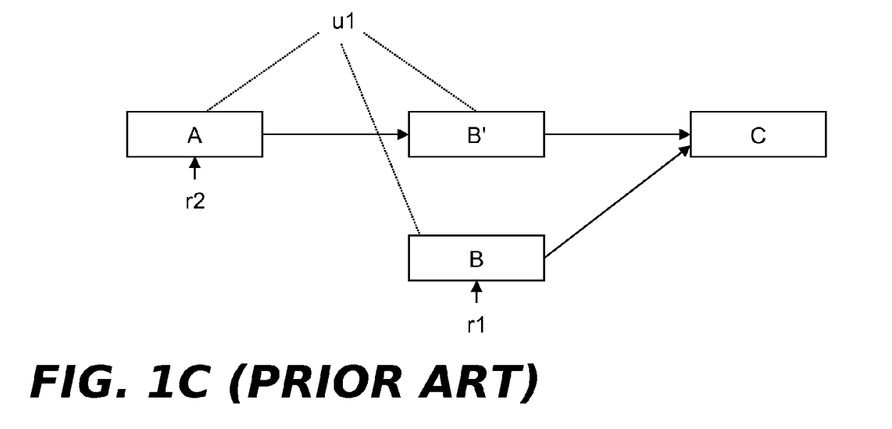

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

Figure 1D:
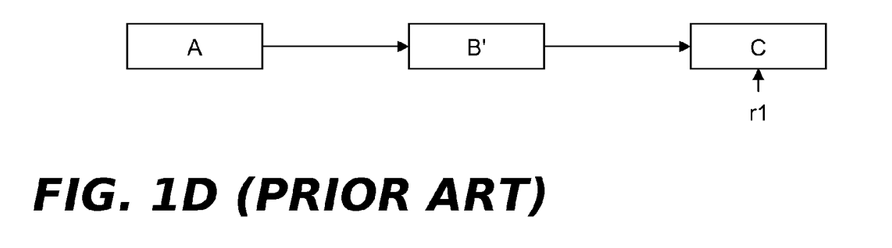

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

Figure 2A:
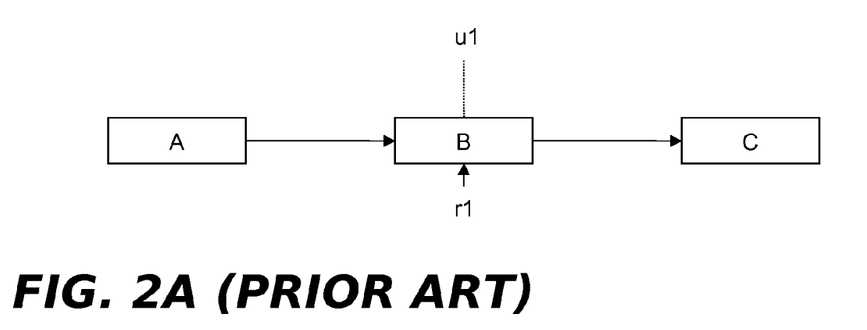
FIGS. 2A-2C are diagrammatic representations of a linked list of data elements undergoing a data element deletion according to a conventional read-copy update mechanism.
Figure 2B:
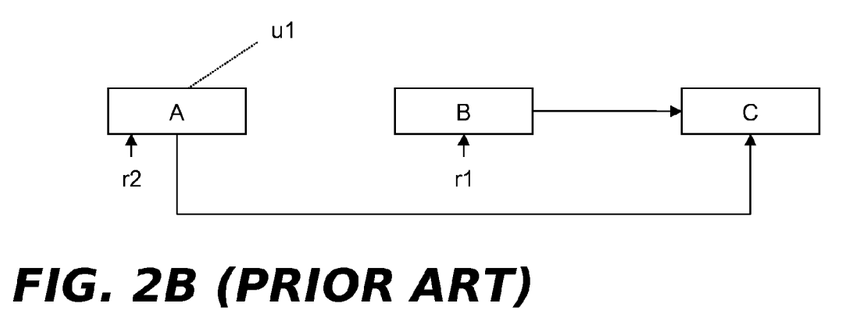
Figure 2C:
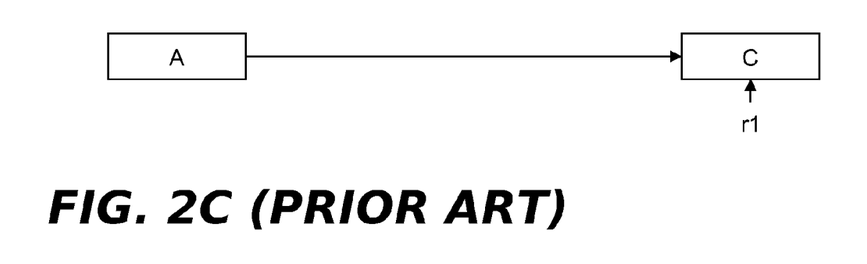

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

Figure 3:
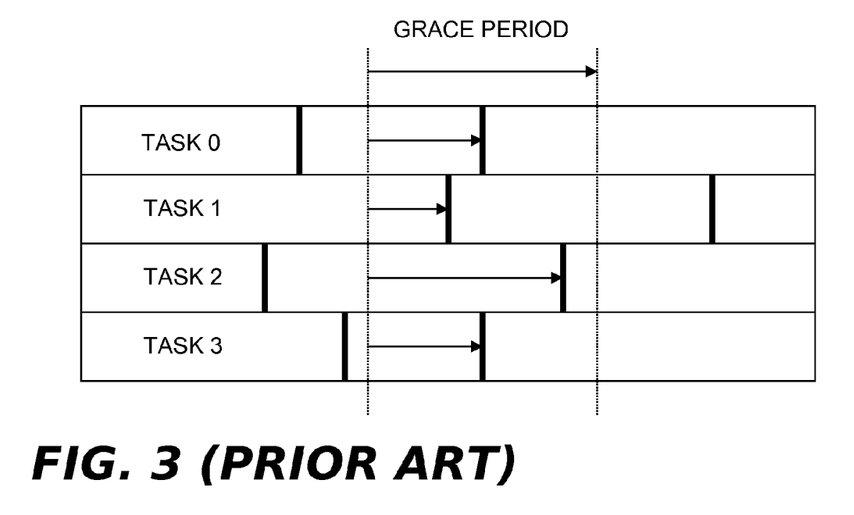
FIG. 3 is a flow diagram illustrating an example prior art grace period in which four processes pass through a quiescent state.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Figure 4:
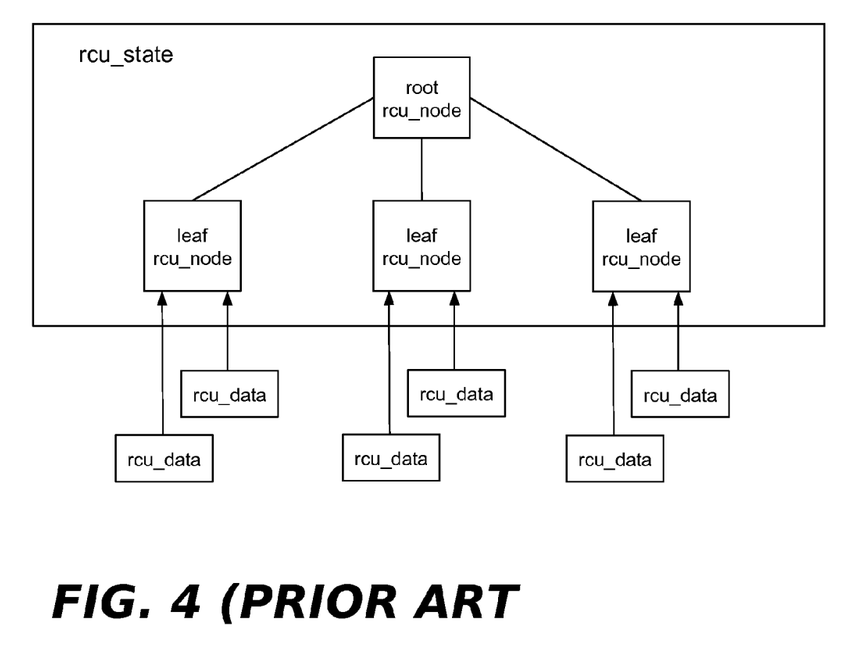
FIG. 4 is a functional block diagram showing an example prior art hierarchical RCU implementation.

RCU implementations may use a combining tree to track quiescent states, with bitmasks at each level of the tree indicating which CPU's quiescent states are required in order to end a grace period. This is known as hierarchical RCU. In hierarchical RCU implementations that support CPU hotplugging, additional bitmasks are provided at each level to indicate which CPU's are offline, and whose quiescent states are therefore not required to end a grace period. In current versions of the Linux® kernel, the RCU combining tree used for quiescent state tracking is implemented using an rcu_state structure that contains a tree of rcu_node structures embedded as a linear array. FIG. 4 illustrates an example two-level tree hierarchy that includes three bottom-level leaf rcu_node structures and a single top level root rcu_node structure. In a larger system with many CPUs, the combining tree could be expanded to include one or more additional levels of rcu_node structures.

The root rcu_node structure in FIG. 4 is reported to by the leaf rcu_node structures. Each leaf rcu_node structure is in turn reported to by a set of CPUs that periodically access their assigned leaf rcu_node structure to record RCU quiescent states. In FIG. 4, there are six CPUs represented by per-CPU rcu_data structures, with two CPUs being assigned to each leaf rcu_node structure. The rcu_data structures are used to maintain certain per-CPU RCU data, such as lists of RCU callbacks.

Although not shown, each of the four rcu_node structures in FIG. 4 has its own lock field, called ->lock. Each also includes the two bitmasks referred to above, respectively called ->qsmask and ->qsmaskinit. The ->qsmask bitmask tracks which CPUs (for leaf rcu_node structures) or groups of CPUs (for non-leaf rcu_node structures) still need to pass through a quiescent state in order for the current grace period to end. The ->qsmaskinit bitmask tracks which CPUs or groups of CPUs still need to pass through a quiescent state for subsequent grace periods to end. RCU's online/offline code manipulates the ->qsmaskinit bitmask, such that this bitmask tracks which CPUs or groups of CPUs are offline. At the beginning of each grace period, the ->qsmaskinit fields are copied to the corresponding ->qsmask fields. Offline CPUs are thereby accounted for in the detection of current grace periods, and will be ignored so as not stall such grace periods (by waiting indefinitely for quiescent states from the offline CPUs).

Modern RCU implementations feature update primitives such as synchronize_rcu( ) to wait for a grace period to elapse in which all pre-existing readers have completed their critical sections. In the older "classic" RCU implementation in the Linux® kernel, RCU read-side critical sections cannot block or be preempted, so all the reader tasks that synchronize_rcu( ) must wait on are running on one of the CPUs. However, in the more recent real-time preemptible implementation of RCU, RCU read-side critical sections may be preempted, which means that synchronize_rcu( ) may also need to wait on tasks that are currently not running.

To track preempted tasks, each leaf rcu_node structure in the preemptible RCU implementation is provided with a ->blkd_tasks list, which is a linked list of tasks that were preempted within an RCU read-side critical section while running on one of the CPUs corresponding to that rcu_node structure. A given task is added to the list when it is preempted, and it removes itself from the list once it exits from its outermost RCU read-side critical section. If a given RCU grace period extends for too long, then in kernels built with RCU priority boosting, those tasks on the ->blkd_tasks list that are blocking the current grace period will be subjected to RCU priority boosting.

The ->lock field in each rcu_node structure is used to protect operations involving tasks on that rcu_node structure's ->blkd_tasks list. Such operations include (1) inserting a task onto the ->blkd_tasks list when the task is preempted while within an RCU read-side critical section, (2) updating the task state to record RCU priority boosting, and (3) removing the task from the ->blkd_tasks list when the task exits its outermost RCU read-side critical section. Note that tasks on the ->blkd_tasks list that entered their RCU read-side critical sections before the start of the current RCU grace period must prevent that grace period from completing. Tasks on the ->blkd_tasks list that entered their RCU read-side critical sections after the start of the current RCU grace period must prevent a subsequent grace period from completing.

Once all of the CPUs corresponding to a given rcu_node structure have gone offline, it is desirable to ignore that rcu_node structure for grace period detection purposes. However, there is no guarantee that an rcu_node structure's ->blkd_tasks list will be empty because the corresponding tasks might still be preempted, or might even be continuing to execute within their RCU read-side critical sections on some other CPU(s). There must therefore be some mechanism to ensure that these tasks continue to block the current or subsequent RCU grace period (as the case may be) despite the corresponding rcu_node structure being ignored during grace period detection.

In older versions of the Linux® kernel, this mechanism involved offlining the last CPU corresponding to a given leaf rcu_node structure, and migrating the tasks in the leaf rcu_node structure's ->blkd_tasks list to a ->blkd_tasks list of the root rcu_node structure. The tasks can only be migrated one at a time because each task's locking domain must be switched from the leaf rcu_node structure to root rcu_node structure. Otherwise, unsynchronized access could corrupt the root rcu_node structure's ->blkd_tasks list.

Unfortunately, the above-described list migration must be carried out with interrupts disabled, which can affect real time performance. Moreover, each ->blkd_tasks list can be quite long, so that migrating them can result in arbitrary degradation of real-time latencies. This was not considered a problem when the above-described task-migration mechanism was designed. At that time, it was expected that real-time systems would avoid offlining CPUs while a real-time application was running. However, recent real-time best practices include offlining a given CPU and then bringing it back online in order to remove extraneous processing from that CPU, thereby providing better real-time response to applications running on the CPU. Furthermore, today's multi-core systems motivate the running of multiple real-time applications on a single system, which means that one CPU might be being offlined and then onlined while a real-time application is running on another CPU.

The inventor named herein has observed a need for a hierarchical RCU grace period detection mechanism that correctly handles CPU hotplugging while avoiding excessive degradation of real-time latency. What is required in particular is a hierarchical RCU grace period detection technique that avoids the delays associated with the above-described task-migration mechanism.

SUMMARY

A method, system and computer program product are provided for use in a preemptible read-copy update (RCU) implementation to facilitate improved hierarchical RCU grace period detection during CPU hotplugging, while avoiding excessive degradation of real-time latency due to task list migration. In an example embodiment, a combining tree of two or more levels is provided to track quiescent states, the levels including a leaf level and a root level. A determination is made whether a condition warrants adjusting hierarchical RCU grace period detection to account for CPUs that have gone offline due to hotplugging operations. The condition is met if (1) a leaf level bitmask of the combining tree is fully cleared to indicate an offline state in which all of its assigned CPUs are offline, and (2) there are no tasks on a task list associated with the fully cleared bitmask.

If the condition is met, the offline state of the leaf level bitmask is propagated up the combining tree to a root level bitmask to thereby establish an adjusted grace period detection state in which the CPUs associated with the fully cleared bitmask are ignored for purposes of grace period detection.

If the condition is only partially met due to the leaf level bitmask being fully cleared to indicate an offline state in which all of its assigned CPUs are offline, but there are tasks remaining on the task list associated with the fully cleared bitmask, then (3) the offline state of the bitmask is not propagated up the combining tree to the root level bitmask, and (4) the associated task list is maintained at the leaf level without migration to the root level. This ensures that the tasks remaining on the task list continue to have effect for purposes of grace period detection without having to migrate the tasks list.

Unless the condition is fully met, existing grace period detection is continued without propagating the offline state.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 5:
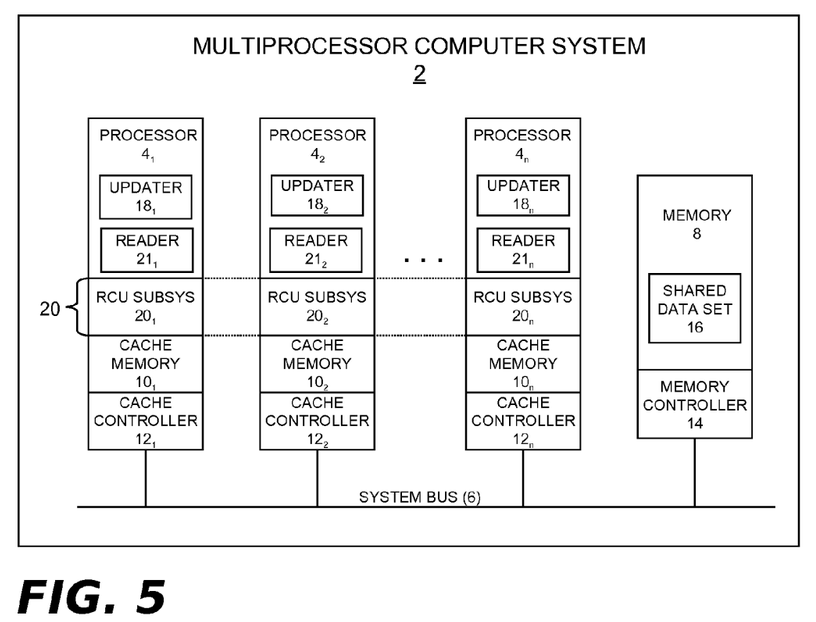
FIG. 5 is a functional block diagram showing a multiprocessor computing system.

Turning now to the figures, wherein like reference numerals represent like elements in all of the several views, FIG. 5 illustrates an example multiprocessor computer system in which the hierarchical RCU grace period detection technique described herein may be implemented. In FIG. 5, a computer system 2 includes a plurality of processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A memory controller 14 is associated with the memory 8. As shown, the memory controller 14 may reside separately from processors $4_2 \ldots 4_n$ (e.g., as part of a chipset). As discussed below, it could also comprise plural memory controller instances residing on the processors $4_1, 4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, as previously mentioned, the memory controller 14 could be provided by plural memory controller instances that are respectively integrated with the processors $4_1, 4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 5, reference numerals $18_1, 18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 5, reference numbers $20_1, 20_2 \ldots 20_n$ represent individual RCU instances that may respectively periodically execute on the several processors $4_1, 4_2 \ldots 4_n$. Operational details of the RCU subsystem 20 are described below.

Any given processor 4 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 5, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

For purposes of the present disclosure, it is assumed that the readers 21 may be preempted while executing within their RCU read-side critical sections. This would be the case, for example, if the readers 21 embody kernel code paths in a preemptible operating system kernel. To accommodate such reader preemption, the RCU subsystem 20 is embodied as a preemptible RCU implementation.

During operation of the computer system 2, an updater 18 will occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may invoke an RCU primitive such as synchronize_rcu( ) to invoke the RCU subsystem 20 to track a grace period for deferred destruction of the pre-update view of the data (second-phase update). The grace period processing performed by the RCU subsystem 20 entails starting new grace periods and detecting the end of old grace periods so that the RCU subsystem 20 knows when it is safe to free stale data (or take other actions).

Figure 6:
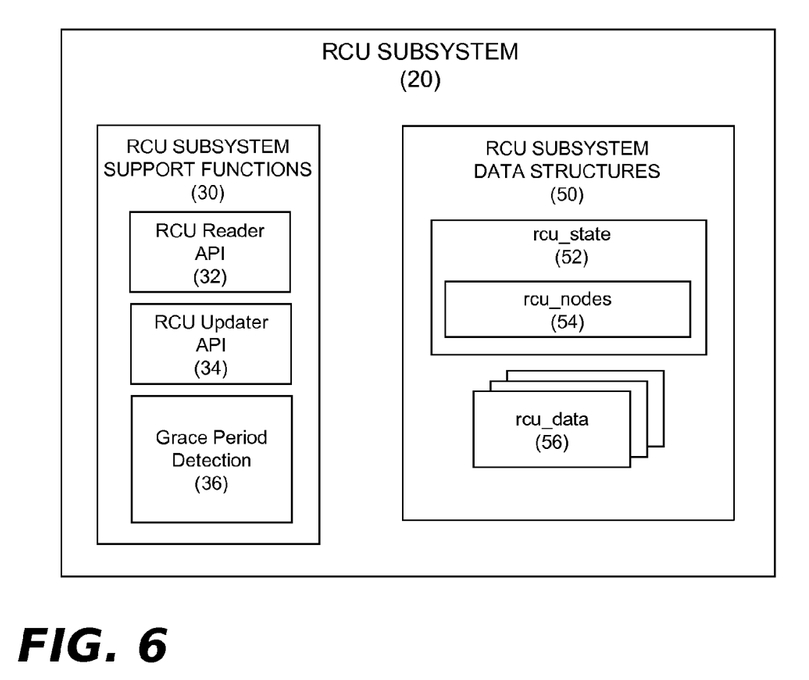
FIG. 6 is a functional block diagram showing an example RCU subsystem that may be provided in the computer system of FIG. 5.

Turning now to FIG. 6, example components of the RCU subsystem 20 are shown. Among these components is a set of RCU subsystem support functions 30, namely, an RCU reader API (Application Programming Interface) 32, an RCU updater API 34, and a set of grace period detection functions 36.

The RCU reader API 32 may comprise a reader registration component and a reader unregistration component that are respectively invoked by readers 21 as they enter and leave their RCU read-side critical sections to read shared data 16. This allows the RCU subsystem 20 to track reader operations and determine when readers are engaged in RCU-protected read-side critical section processing. In an example embodiment, the reader registration and unregistration components may be respectively implemented using the rcu_read_lock( ) and rcu_read_unlock( ) primitives found in existing read-copy update implementations.

The RCU updater API 34 may comprise a synchronization primitive such as synchronize_rcu( ) for use by updaters 18 to defer the removal of shared data 16 that may be referenced by the readers 21 until the grace period detection component 36 determines that a grace period has elapsed.

The grace period detection component 36 of the RCU subsystem 20 includes various functions that participate in starting new grace periods and detecting the end of old grace periods. The grace period detection component 36 further includes an improved mechanism to facilitate improved hierarchical RCU grace period detection during CPU hotplugging, while avoiding excessive degradation of real-time latency due to task list migration. The operational details of this improved mechanism are described in more detail below.

With continuing reference now to FIG. 6, the RCU subsystem 20 further includes a set of RCU subsystem data structures 50. These data structures include an rcu_state structure 52 having embedded therein (e.g., as a linear array) a combining tree of rcu_node structures 54. The RCU subsystem 20 thus supports hierarchical grace period detection, and may therefore be characterized as a hierarchical RCU implementation. The tree of rcu_node structures tracks quiescent states, with ->qsmask and ->qsmaskinit bitmasks at each level of the tree (not shown in FIG. 6) respectively indicating which CPU's quiescent states are still required in order to end current and future grace periods. Leaf rcu_node structures 54 also maintain a ->blkd_tasks list (not shown in FIG. 6) to track readers 21 that have been preempted within their RCU read-side critical sections. The use of ->lock fields (not shown in FIG. 6) within the rcu_node structures 54 serializes access to the ->qsmask and ->qsmaskinit bitmasks and the ->blkd_tasks lists. Each leaf rcu_node structure 54 additionally has a set of a per-processor rcu_data structures 56 assigned to it. Each rcu_data structure 56 represents one CPU in the computer system 2.

As discussed in the "Background" section above, the last CPU of a leaf rcu_node structure 54 can go offline while the leaf rcu_node structure's ->blkd_tasks list is non-empty. In prior art RCU implementations, the offline state of the leaf rcu_node structure's ->qsmaskinit bitmask is promptly propagated up the rcu_node tree hierarchy to the root rcu_node structure. At the same time, grace period stalling is prevented by migrating the ->blkd_tasks list of the leaf rcu_node structure to the root rcu_node structure. As indicated at the conclusion of the "Background" section above, the inventor named herein has observed that this strategy can result in a real-time performance penalty due to the overhead associated with the list moving operations, such as having to repeatedly release and acquire the ->locks of the leaf and root rcu_node structures as the tasks are migrated one at a time.

The improved hierarchical RCU grace period detection technique disclosed herein overcomes this problem. When a leaf rcu_node structure's ->qsmaskinit bitmask is fully cleared due to all of its assigned CPUs going offline as a result of hotplugging operations, the bitmask state is not immediately propagated to the root rcu_node structure as in prior art RCU implementations. Instead, propagation is deferred until all tasks are removed from the leaf rcu_node structure's ->blkd_tasks list. Deferring bitmask propagation obviates the need to migrate the ->blkd_tasks list to the root rcu_node structure in order to prevent premature grace period termination. The ->blkd_tasks list can remain at the leaf rcu_node structure. In this way, CPU hotplugging is accommodated while avoiding excessive degradation of real-time latency stemming from the now-eliminated task list migration operation.

Figure 7A:
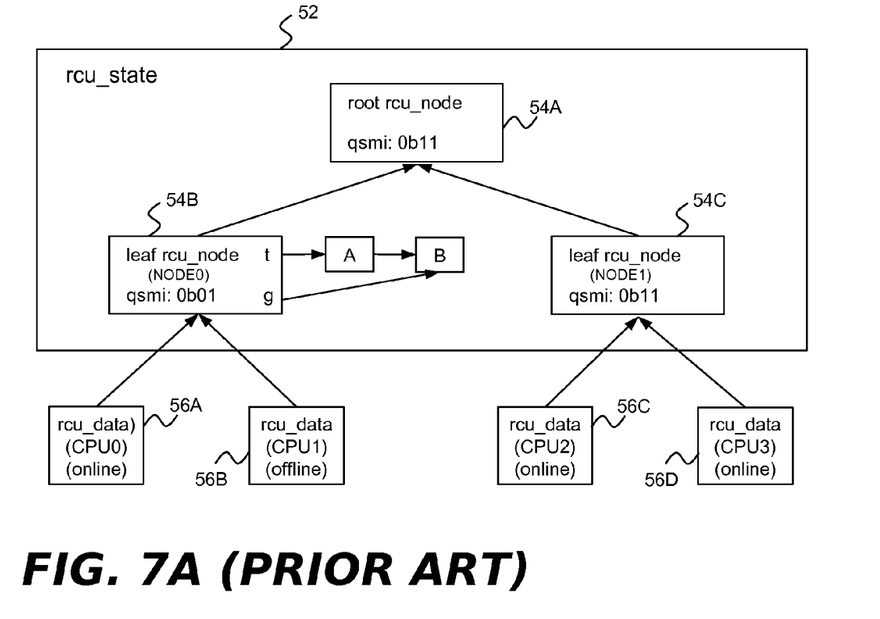
FIG. 7A is a functional block diagram showing the prior art hierarchical RCU implementation of FIG. 4 prior to all CPUs of a leaf rcu_node structure going offline, with the ->qsmaskinit bitmasks of the leaf and root rcu_node structures reflecting this fact, and with the leaf rcu_node structure having two preempted tasks on its ->blkd_tasks list, one blocking a current grace period and the other blocking a subsequent grace period.
Figure 7B:
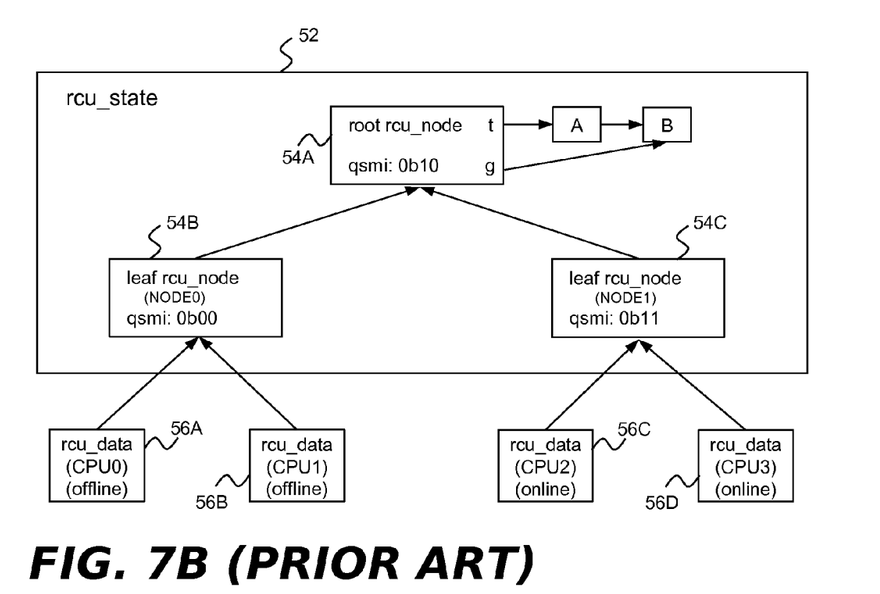
FIG. 7B is a functional block diagram corresponding to FIG. 7A, but following all CPUs of a leaf rcu_node structure going offline, with the ->qsmaskinit bitmask of the leaf rcu_node structure being updated to reflect this fact, with the ->qsmaskinit state of the leaf having been propagated to a corresponding field of the root rcu_node structure's ->qsmaskinit bitmask, and with the leaf rcu_node structure's ->blkd_tasks list having been migrated to the root rcu_node structure.

Before describing the foregoing technique in more detail, it will be helpful to illustrate an example of the prior art grace period detection approach that uses ->blkd_tasks list migration. Turning now to FIGS. 7A and 7B, a simplified view of an rcu_state structure 52 is shown. The rcu_state structure 52 embodies an RCU hierarchy that includes a root rcu_node structure 54A and two leaf rcu_node structures 54B (Node0) and 54C (Node1). Two rcu_data structures 56A and 56B (respectively corresponding to CPU0 and CPU1) report to the leaf rcu_node structure 54B. Two more rcu_data structures 56C and 56D (respectively corresponding to CPU2 and CPU3) report to the other leaf rcu_node structure 54C. Both leaf rcu_node structures 54B and 54C report to the root level rcu_node structure 54A.

In FIG. 7A, CPU0, CPU2 and CPU3 are online and CPU1 is offline. This is reflected in the ->qsmaskinit bitmasks of the leaf rcu_node structures 54B and 54C, each of which is abbreviated "qsmi." The rcu_node structure 54C has its ->qsmaskinit bitmask set to 0b11, indicating that both its CPUs (CPU2 and CPU3) are online. The rcu_node structure 54B has its ->qsmaskinit bitmask set to 0b01, indicating that CPU0 is online but CPU1 is offline. The root rcu_node structure 54A has its ->qsmaskinit mask set to 0b11, indicating that both of its subordinate leaf rcu_node structures 54B and 54B have at least one online CPU. Note that the rcu_node structures 54 will also have a ->lock field and a ->qsmask bitmask, as described above, but these are not shown to facilitate ease of understanding.

The leaf rcu_node structure 54B is shown to be tracking two tasks (designated "A" and "B") that have been preempted while in their current RCU read-side critical sections while running on a CPU assigned to the leaf rcu_node structure 54B (i.e., CPU0 or CPU1). Both tasks are therefore members of the ->blkd_tasks list of leaf rcu_node structure 54B. The tag "t" in FIGS. 7A and 7B signifies a ->blkd_tasks pointer representing the head of the ->blkd_tasks list. The tag "g" in FIGS. 7A and 7B signifies a ->gp_tasks pointer representing the beginning of a tail portion of the ->blkd_tasks list that contains tasks blocking the current grace period. Because task B is on this tail portion of the ->blkd_tasks list, task B began its RCU read-side critical section before the beginning of the current RCU grace period. Therefore, the ->gp_tasks pointer "g" of the leaf rcu_node structure 54B references it, indicating that the current grace period must wait for task B to exit its RCU read-side critical section. Task A, on the the other hand, began its RCU read-side critical section after the beginning of the current RCU grace period, so it appears in the ->blkd_tasks list before the ->gp_tasks pointer, indicating that the current grace period need not wait on it, although the next grace period must do so.

Offlining CPU 0 using the prior-art scheme would result in the state shown in FIG. 7B. Here, the leaf rcu_node structure 54B has both ->qsmaskinit bits cleared, indicating that both of its CPUs (CPU0 and CPU1) are now offline. Moreover, the fully offline CPU state indicated by the ->qsmaskinit bitmask of the leaf rcu_node structure 54B is propagated to the ->qsmaskinit bitmask of the root rcu_node structure 54A. This results in the root rcu_node structure 54A having its low-order ->qsmaskinit bit cleared, indicating that the rcu_node structure 54B (Node0) has no online CPUs and may now be ignored by the grace period detection function 36 of FIG. 6. Relatedly, the ->blkd_tasks list of preempted tasks that was associated with the leaf rcu_node structure 54B leaf has been migrated to the root rcu_node structure 54A. The current grace period will now correctly wait for task B and the next grace period will correctly wait for task A, but with the real-time latency penalty caused by the ->blkd_tasks list migration.

The hierarchical RCU grace period detection technique proposed herein will now be described with reference to the example shown in FIGS. 8A-8D. These figures use the same rcu_state, rcu_node and rcu_data structures shown in FIGS. 7A and 7B. The operations to be described may be implemented as part of the grace period detection function 36 shown in FIG. 6, or they may be implemented in some other portion of the RCU subsystem 20.

Figure 8A:
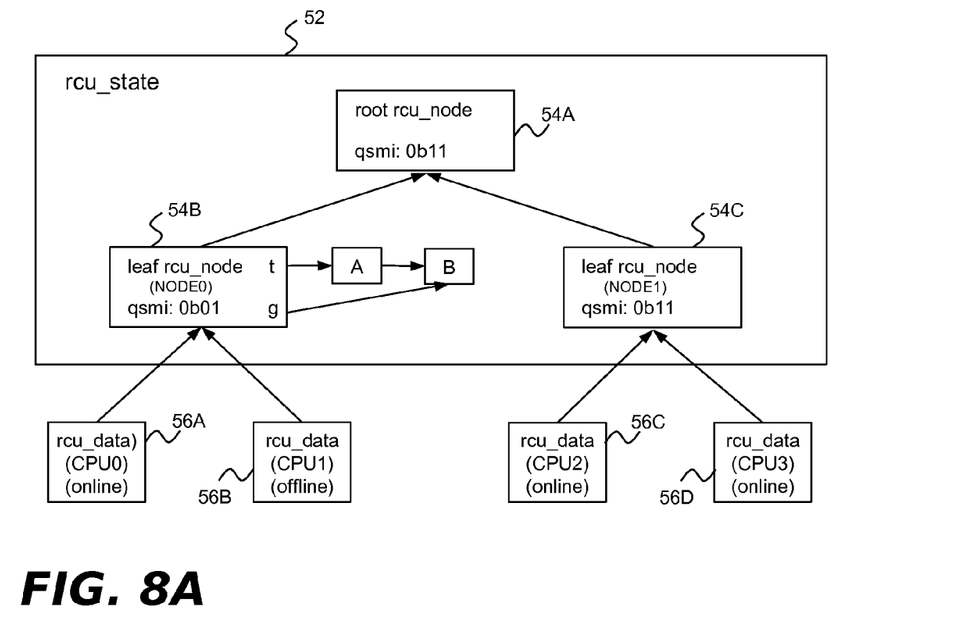
FIG. 8A is a functional block diagram showing a hierarchical RCU implementation operating in accordance with the hierarchical RCU grace period detection technique disclosed herein, prior to all CPUs of a leaf rcu_node structure going offline, with the ->qsmaskinit bitmasks of the leaf and root rcu_node structures reflecting this fact, and with the leaf rcu_node structure having preempted tasks on its ->blkd_tasks list, one blocking a current grace period and the other blocking a subsequent grace period.

FIG. 8A shows the same initial state as in FIG. 7A. CPU0, CPU2 and CPU3 are online and CPU1 is offline. The ->blkd_tasks list of the leaf rcu_node structure 54B has tasks A and B, with task B blocking the current grace period and task A blocking the next grace period.

Figure 8B:
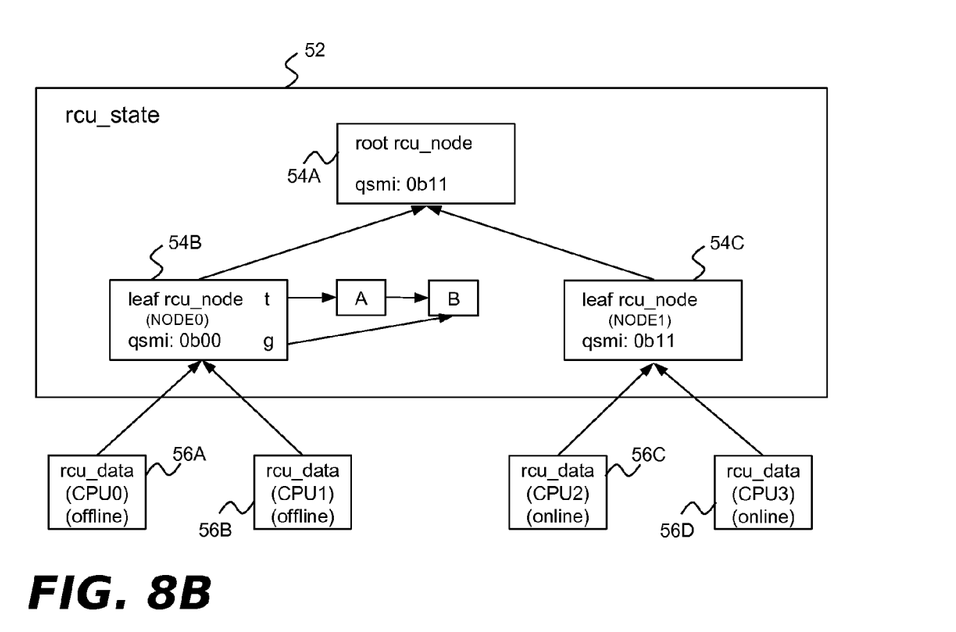
FIG. 8B is a functional block diagram corresponding to FIG. 8A, but following all CPUs of a leaf node rcu_node structure going offline, with the ->qsmaskinit bitmask of the leaf rcu_node structure being updated to reflect this fact, but with the root rcu_node structure's ->qsmaskinit bitmask not being updated at this time, and with the leaf node rcu_node structure's ->blkd_tasks list not being migrated to the root rcu_node structure.
Figure 8C:
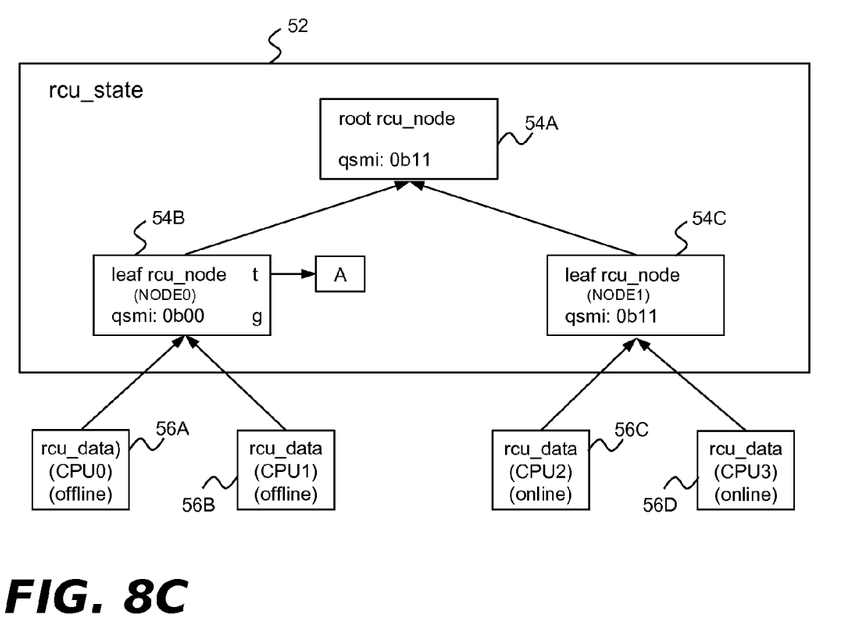
FIG. 8C is a functional block diagram corresponding to FIG. 8B, but at a point where the leaf rcu_node structure's ->blkd_tasks list has no preempted task blocking a current grace period and one preempted task blocking a subsequent grace period.
Figure 8D:
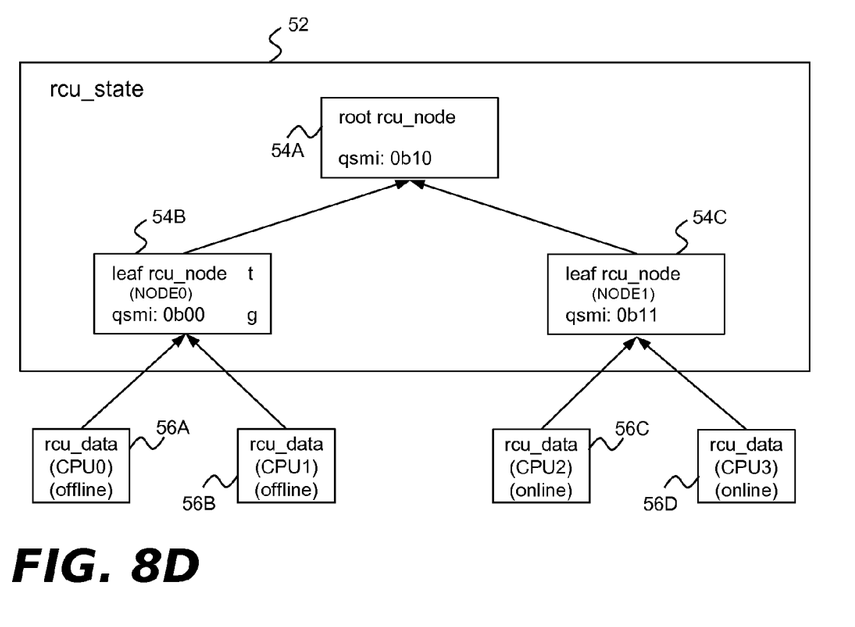
FIG. 8D is a functional block diagram corresponding to FIG. 8C, but at a point where the leaf rcu_node structure's ->blkd_tasks list has no preempted tasks blocking any grace periods, and with the root rcu_node structure's qsmaskinit bitmask being updated to reflect the state of the leaf rcu_node structure having no online CPUs and no preempted tasks on its ->blkd_tasks list.

FIGS. 8B-8D illustrate several stages of operation to handle the scenario where CPU0 assigned to leaf rcu_node structure 54B goes offline, such that there are no long any online CPUs associated with that rcu_node structure. The first stage is shown in FIG. 8B. Here, CPU0 has gone offline, but unlike FIG. 7B, the ->blkd_tasks list of the leaf rcu_node structure 54B remains in place and is not migrated to the root rcu_node structure 54A. Also, the bit associated with the leaf rcu_node structure 54B remains set in the root rcu_node structure's ->qsmaskinit bitmask. Instead of propagating the fully offline CPU state indicated by the ->qsmaskinit bitmask of the leaf rcu_node structure 54B to the ->qsmaskinit bitmask of the root rcu_node structure 54A, as in FIG. 7A, there is no propagation at this point.

Propagation as used herein refers to clearing ->qsmaskinit bits up the hierarchy of rcu_node structures 54 of the rcu_state structure 52, with each lower level rcu_node structure clearing its assigned bit in the higher level rcu_node structure to which it reports. In FIG. 8B, such propagation can be be deferred due to maintaining Tasks A and B on the leaf rcu_node structure's ->blkd_tasks list. As a result of deferring propagation, the grace period detection function 36 of the RCU subsystem 20 continues to assume (from the state of the root rcu_node structure's ->qsmaskinit bitmask) that there is something in the leaf rcu_node structure 54B that must be waited on (tasks A and B in this case), such that the leaf rcu_node structure cannot be ignored for purposes of grace period detection. All that has changed is that the bit associated with CPU0 in the ->qsmaskinit bitmask of the leaf rcu_node structure 54B has been cleared to indicate the newly offlined state of CPU 0.

As shown in FIG. 8C, when task B exits from its RCU read-side critical section, it will remove itself from the ->blkd_tasks list of the leaf rcu_node structure 54B. Assuming that CPU2 and CPU3 associated with the leaf rcu_node structure 54C have also passed through a quiescent state for the current grace period, the removal of task B will allow the current grace period to complete. As an aside, current grace period detection is handled by manipulating the ->qsmask bitmasks of the rcu_node structures 54A, 54B and 54C. As noted in the "Background" section above, an rcu_node structure's ->qsmask bitmask indicates when CPUs or groups of CPUs have passed through a quiescent state that on which the current grace period depends. For ease of understanding, the ->qsmask bitmasks of the rcu_node structures 54A, 54B and 54C are not shown. Nor are the rcu_node structure ->lock fields.

With continued reference to FIG. 8C, task A remains in its RCU read-side critical section, and therefore will block the next grace period. It is maintained on the ->blkd_tasks list of the leaf rcu_node structure 54B. At this point, there is still no propagation of the fully offline CPU state indicated by the ->qsmaskinit bitmask of the leaf rcu_node structure 54B to the ->qsmaskinit bitmask of the root rcu_node structure 54A. The root rcu_node structure's ->qsmaskinit bitmask bit corresponding to the leaf rcu_node structure 54B remains set, indicating to the grace period detection function 36 that this leaf rcu_node structure must still be accounted for during grace period detection.

Turning now to FIG. 8D, task A has finally exited its RCU read-side critical section and the ->blkd_tasks list of the leaf rcu_node structure 54B is empty. A two part condition now holds in which the ->qsmaskinit bitmask of the leaf rcu_node structure 54 is fully cleared, and its ->blkd_tasks list is empty. Based on this condition, the fully offline CPU state indicated by the ->qsmaskinit bitmask of the leaf rcu_node structure 54B is now propagated to the ->qsmaskinit bitmask of the root rcu_node structure 54A. The result is that the bit in the root's ->qsmaskinit bitmask corresponding to the leaf rcu_node structure 54B is cleared. At this point, the grace period detection function 36 determines that there is no longer a need to wait for anything on the leaf rcu_node structure 54B, and that leaf rcu_node may be ignored for purposes of grace period detection.

Of course, it is possible that either CPU0 or CPU1 might have come online in the meantime. Had this happened, the ->qsmaskinit bitmask of the leaf rcu_node structure 54B would have been non-zero when task A exited its RCU read-side critical section. This this condition would have prevented any propagation of the ->qsmaskinit bitmask state of the leaf rcu_node structure 54B to the root rcu_node structure 54A because bitmask propagation requires that a leaf rcu_node structure's ->qsmaskinit bitmask be fully cleared. The bit in the root rcu_node structure's ->qsmaskinit bitmask that corresponds to the leaf rcu_node structure 54B would remain set, and the grace period detection function 36 would continue to track the leaf rcu_node structure 54B.

Contrasting the operations of FIGS. 8A-8D with the prior art grace period detection technique shown in FIGS. 7A-7B, all tasks on a leaf rcu_node structure's ->blkd_tasks list are allowed to remain on the leaf rcu_node structure instead of migrating them to the root rcu_node structure, even after all CPUs corresponding to the leaf rcu_node structure have gone offline. Compensating for this refusal to migrate tasks is the deferred propagation of ->qsmaskinit bitmask clearing up the rcu_node tree until after the last task on the leaf rcu_node structure's ->blkd_tasks list has exited its outermost RCU read-side critical section. By so doing, the completion of grace periods will be blocked as needed while still maintaining low levels of lock contention (and thus providing for high scalability) and also maintaining good real-time latencies.

Figure 9:
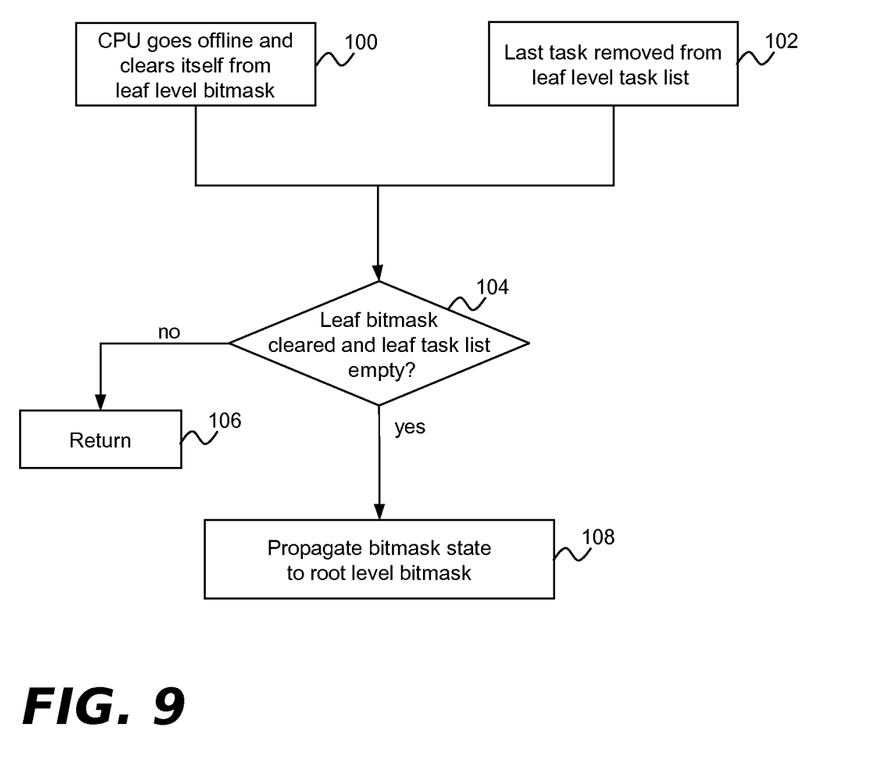
FIG. 9 is a flow diagram illustrating example generalized operations of the hierarchical RCU grace period detection technique disclosed herein.

Turning now to FIG. 9, generalized hierarchical RCU grace period detection operations for producing the state changes in FIGS. 8A-8D are shown. These operations, which are applicable to any type of preemptible read-copy update (RCU) implementation, illustrate generally how improved hierarchical RCU grace period detection may be achieved during CPU hotplugging while avoiding excessive degradation of real-time latency due to task list migration. As used herein, a hierarchical RCU implementation may represent any form of RCU that uses a combining tree of two or more levels to track quiescent states, the levels including a leaf level and a root level. In the embodiment of FIGS. 8A-8D, the combining tree was implemented as a hierarchy rcu_node structures, as shown in FIG. 5. However, other forms of combining tree could also be used.

The combining tree may have at least one bitmask at each of the levels indicating which CPU's are offline and whose quiescent states are not required to end a grace period, each leaf level bitmask having fields associated with a set of assigned CPUs, and the root level bitmask having fields associated with a set of lower level bitmasks. The combining tree may further have one or more task lists at the leaf level identifying tasks that were preempted while in an RCU read-side critical section and are blocking a grace period. Each leaf level task list is associated with a set of assigned CPUs that is also assigned to one of the leaf level bitmasks, such that each of the leaf level tasks lists is thereby associated with one of the leaf level bitmasks. In the embodiment of FIGS. 8A-8D, the bitmasks were provided by rcu_node structure ->qsmaskinit bitmasks, and the task lists were provided by rcu_node structure ->blkd_tasks lists. However, other types of bitmasks and task lists could be used.

Periodically, the fields of the leaf level bitmasks are cleared as the CPUs assigned to those bitmasks go offline. These operations are exemplified by block 100 in FIG. 9. Block 100 represents a hotplugging operation in which a CPU goes offline and clears itself from is assigned leaf level bitmask. If the RCU subsystem data structures 50 of FIG. 6 are being used, block 100 would entail clearing a bit in the ->qsmaskinit bitmask of a CPU's leaf rcu_node structure 54. In a specific embodiment, block 100 may be implemented by modifying the existing hierarchical RCU function known as rcu_cleanup_dead_cpu( ), which currently performs the prior art ->blkd_tasks list migration operations, the modification being to remove the task migration functionality and add logic that invokes block 104 (see below) when the last CPU to go offline clears the ->qsmaskint bit mask of its leaf rcu_node structure 54.

Periodically, tasks are removed from the task lists as the tasks exit their RCU read-side critical sections. These operations are exemplified by block 102 in FIG. 9. Block 102 represents an RCU blocked reader assistance operation in which a task that was preempted during an RCU read-side critical section exits that critical section and is the last task removed from a leaf level task list associated with the CPU on which the task was running at the time of preemption. If the RCU subsystem data structures 50 of FIG. 6 are being used, block 102 would entail the task removing itself from the ->blkd_task list of the CPU's leaf rcu_node structure. In a specific embodiment, block 102 may be implemented by modifying the existing hierarchical RCU function known as rcu_read_unlock_special( ) the modification being to invoke block 104 (see below) when the last task is removed from the leaf rcu_node structure's ->blkd_task list.

Block 104 of FIG. 9 follows blocks 100 and 102. In block 104, a determination is made whether a condition warrants adjusting hierarchical RCU grace period detection to account for CPUs that have gone offline due to hotplugging operations. The condition is met if (1) one of the leaf level bitmasks is fully cleared to indicate an offline state in which all of its assigned CPUs are offline, and (2) there are no tasks on the task list associated with the fully cleared bitmask. If the RCU subsystem data structures 50 of FIG. 6 are being used, the first part of the condition of block 104 would be determined to be satisfied when the ->qsmaskinit bitmask of a leaf rcu_node structure 54 is completely cleared, indicating that all CPUs for this leaf rcu_node structure are offline. The second part of the condition of block 104 would be determined to be satisfied when the leaf rcu_node structure's ->blkd_tasks list is empty.

Block 106 exemplifies a state where the condition checked for in block 104 is not met. In that case, processing returns to the caller, and existing grace period detection is continued without adjusting the grace period detection state to account for newly offlined CPUs. Note that block 106 may be reached if neither part of the condition checked for in block 104 is satisfied. Moreover, block 106 will be reached if condition checked for in block 104 is only partially met because one of the condition's two parts remain unsatisfied.

Of particular interest is the state where the condition is only partially met due to one of the leaf level bitmasks (e.g., a leaf rcu_node structure's ->qsmaskinit bitmask) being fully cleared to indicate an offline state in which all of its assigned CPUs are offline, but there are tasks remaining on the task list associated with the fully cleared bitmask (e.g., the same leaf rcu_node structure's ->blkd_tasks list). In that case, the return from processing in block 106 means that the offline state of the leaf level bitmask is not propagated up the combining tree to the root level bitmask, and the task lists are maintained at the leaf level without migration to the root level. This ensures that the tasks remaining on the task list will continue to have effect for purposes of grace period detection without having to migrate the tasks list.

Block 108 exemplifies a state where the condition checked for in block 104 is met. In that case, the offline state of the leaf level bitmask (e.g., a leaf rcu_node structure's ->qsmaskinit bitmask) is propagated up the combining tree to the root level bitmask (e.g., the root rcu_node structure's ->qsmaskinit bitmask) to thereby establish an adjusted grace period detection state in which the leaf rcu_node structure and anything else associated with the fully cleared bitmask are now ignored for purposes of grace period detection.

Note that locking synchronization between the CPU hotplug operation in block 100 and the propagation operation of block 108, both of which can manipulate the same leaf level bitmask (e.g., a leaf rcu_node structure's ->qsmaskinit bitmask), may be provided by a leaf level lock. If the RCU subsystem data structures 50 of FIG. 6 are being used, the lock would be provided by a leaf rcu_node structure's ->lock field. This lock would be held in order to clear a bit in a ->qsmaskinit bitmask, and while propagating the state of a fully cleared ->qsmaskinit bitmask up the rcu_node structure hierarchy.

Accordingly, a technique has been disclosed for use in a preemptible read-copy update (RCU) implementation to facilitate improved hierarchical RCU grace period detection during CPU hotplugging while avoiding excessive degradation of real-time latency due to task list migration. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 5-9.

With respect to a computer program product, digitally encoded program instructions may be stored on one or more computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 10:
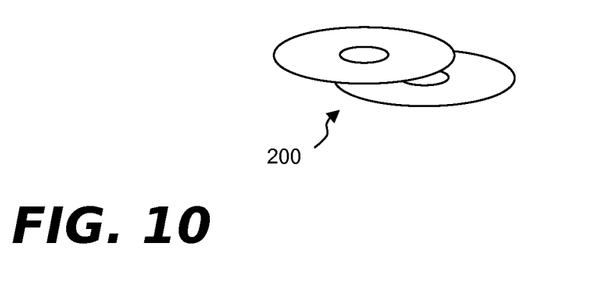
FIG. 10 is a diagrammatic illustration showing example computer readable data storage media that may be used to provide a computer program product in accordance with the present disclosure.

Example computer readable data storage media for storing such program instructions are shown by reference numerals 8 (memory) and 10 (cache) of the computer system 2 of FIG. 5. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs). Examples of such media are shown by reference number 200 in FIG. 10.

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A hierarchical read-copy update (RCU) grace period detection method that accommodates CPU-hotplugging while avoiding degradation of real-time latency due to task list migration, comprising:

providing a combining tree of two or more levels to track quiescent states, said levels including a leaf level and a root level;

determining whether a condition warrants adjusting hierarchical RCU grace period detection to account for CPUs that have gone offline due to hotplugging operations;

said condition being met if (1) a leaf level bitmask of said combining tree is fully cleared to indicate an offline state in which all of its assigned CPUs are offline, and (2) there are no tasks on a task list associated with said fully cleared bitmask;

if said condition is met, then propagating said offline state of said leaf level bitmask up said combining tree to a root level bitmask to thereby establish an adjusted grace period detection state in which said fully cleared bitmask's assigned CPUs are ignored for purposes of grace period detection;

if said condition is partially met due to said leaf level bitmask being fully cleared to indicate an offline state in which all of its assigned CPUs are offline, but there are tasks remaining on said task list associated with said fully cleared bitmask, then (3) refraining from propagating said offline state up said combining tree to said root level bitmask and (4) maintaining said associated task list at said leaf level without migration to said root level, thereby ensuring that said tasks remaining on said task list will continue to have effect for purposes of grace period detection without having to migrate said task list; and unless said condition is fully met, continuing existing grace period detection without propagating said offline state.

2. The method of claim 1, wherein said determining whether a condition warrants adjusting said hierarchical RCU grace period detection to account for CPUs that have gone offline due to a hotplugging operation is performed whenever said hotplugging operation results in said leaf level bitmask being fully cleared to indicate said offline state.

3. The method of claim 1, wherein said determining whether a condition warrants adjusting said hierarchical RCU grace period detection to account for CPUs that have gone offline due to a hotplugging operation is performed whenever a last remaining task of said task list is removed from said task list.

4. The method of claim 1, wherein locking synchronization is provided between said periodically clearing fields of said leaf level bitmask and said propagating said offline state of said leaf level bitmask up said combining tree to said root level bitmask.

5. The method of claim 1, wherein said levels of said combining tree each comprise one or more data structures, each of which maintains a bitmask, said data structures at said leaf level each further maintain a task list.

6. The method of claim 1, wherein each of said leaf level bitmasks comprises one bit for each CPU assigned said leaf level bitmask, and wherein said root level bitmask comprises one bit for each lower level bitmask assigned to said root level bitmask.

7. The method of claim 1, wherein said tasks lists each comprise a first list portion containing tasks that are blocking a current grace period and second list portion containing tasks that are blocking a next grace period.

* * * * *